(12) United States Patent
Lee et al.

(10) Patent No.: US 8,842,610 B2
(45) Date of Patent: Sep. 23, 2014

(54) METHOD AND APPARATUS FOR REPORTING CHANNEL STATUS INFORMATION IN A WIRELESS COMMUNICATION SYSTEM

(75) Inventors: In Ho Lee, Suwon-si (KR); Youn Sun Kim, Seongnam-si (KR); Jin Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 46 days.

(21) Appl. No.: 13/516,965

(22) PCT Filed: Dec. 28, 2010

(86) PCT No.: PCT/KR2010/009427
§ 371 (c)(1),
(2), (4) Date: Jul. 26, 2012

(87) PCT Pub. No.: WO2011/081410
PCT Pub. Date: Jul. 7, 2011

(65) Prior Publication Data
US 2012/0294153 A1 Nov. 22, 2012

(30) Foreign Application Priority Data

Dec. 30, 2009 (KR) .................. 10-2009-0134046
Feb. 12, 2010 (KR) .................. 10-2010-0013291

(51) Int. Cl.
*H04W 24/10* (2009.01)
*H04L 1/00* (2006.01)
*H04L 5/00* (2006.01)
*H04B 7/06* (2006.01)

(52) U.S. Cl.
CPC ............ *H04B 7/0647* (2013.01); *H04B 7/0626* (2013.01); *H04L 1/0027* (2013.01); *H04L 1/0026* (2013.01); *H04L 5/0057* (2013.01)
USPC ......................................... 370/328; 714/748

(58) Field of Classification Search
USPC .............. 370/241, 328, 343, 344; 455/24, 69; 714/748
See application file for complete search history.

(56) References Cited

U.S. PATENT DOCUMENTS

2010/0202372 A1* 8/2010 Chun et al. .................... 370/329
2010/0238824 A1* 9/2010 Farajidana et al. ........... 370/252
2010/0255790 A1* 10/2010 Farajidana et al. ............. 455/69

(Continued)

FOREIGN PATENT DOCUMENTS

KR  1020090017963  2/2009

OTHER PUBLICATIONS

PCT/ISA/237 Written Opinion issued on PCT/KR2010/009427 (pp. 4).
PCT/ISA/210 Search Report issued on PCT/KR2010/009427 (pp. 3).

(Continued)

*Primary Examiner* — Paul H Masur
(74) *Attorney, Agent, or Firm* — The Farrell Law Firm, P.C.

(57) ABSTRACT

An apparatus and a method are provided for transmitting feedback information by a User Equipment (UE) in a communication system. The method includes generating, by the UE, first feedback information; transmitting the first feedback information at a first time point in a first period; generating second feedback information; and transmitting the second feedback information at a second time point in a second period. The first time point and the second time point are different points from start points of the first period and the second period, respectively.

20 Claims, 11 Drawing Sheets

(56) References Cited

U.S. PATENT DOCUMENTS

| | | | |
|---|---|---|---|
| 2010/0322176 A1* | 12/2010 | Chen et al. | 370/329 |
| 2010/0323684 A1* | 12/2010 | Cai et al. | 455/422.1 |
| 2011/0085610 A1* | 4/2011 | Zhuang et al. | 375/260 |
| 2011/0116437 A1* | 5/2011 | Chen et al. | 370/312 |
| 2011/0244877 A1* | 10/2011 | Farajidana et al. | 455/452.2 |
| 2012/0218937 A1* | 8/2012 | Chen et al. | 370/328 |

OTHER PUBLICATIONS

R1-093772, Consideration on CSI-RS Design, 3GPP TSG RAN WG1 Meeting #58, Oct. 12-16, 2009 (pp. 6).

R1-093809, Further Investigation on CSI-RS Design for LTE-Advanced, 3GPP TSG RAN WG1 Meeting #58bis, Oct. 12-16, 2009 (pp. 5).

R1-092204, Discussion on CSI-RS for LTE-Advanced, 3GPP TSG RAN WG1 Meeting #57, May 4-9, 2009 (pp. 7).

* cited by examiner (PRIOR ART)

METHOD AND APPARATUS FOR REPORTING CHANNEL STATUS INFORMATION IN A WIRELESS COMMUNICATION SYSTEM

BACKGROUND OF THE INVENTION

1. Field of the Invention

The present invention relates to an apparatus and method for reporting channel status in a cellular radio communication system and, in particular, a method and system for reporting the channel status information in a feedback order determined according to time-varying characteristic of feedback information when the reference signal for downlink channel estimation is transmitted at long period.

2. Description of the Related Art

The mobile communication system has evolved into a high-speed, high-quality wireless packet data communication system to provide data and multimedia services beyond the early voice-oriented services. Recently, various mobile communication standards, such as High Speed Downlink Packet Access (HSDPA), High Speed Uplink Packet Access (HSUPA), High Rate Packet Data (HRPD) defined in $3^{rd}$ Generation Partnership Project-2 (3GPP2), and 802.16 defined in IEEE, have been developed to support the high-speed, high-quality wireless packet data communication services.

The existing $3^{rd}$ generation wireless packet data communication system, such as HSDPA, HSUPA and HRPD, uses technologies such as Adaptive Modulation and Coding (AMC) and Channel-Sensitive Scheduling to improve the transmission efficiency. With the use of AMC, a transmitter can adjust the amount of transmission data according to the channel state. That is, when the channel state is not 'Good', the transmitter reduces the amount of transmission data to adjust the reception error probability to a desired level, and when the channel state is 'Good', the transmitter increases the amount of transmission data to adjust the reception error probability to the desired level, thereby efficiently transmitting a large volume of information. With the use of the Channel-Sensitive Scheduling-based resource management method, the transmitter selectively services the user having a better channel state among several users, thus increasing the system capacity compared to the method of allocating a channel to one user and servicing the user with the allocated channel. Such capacity increase is so called 'multi-user diversity gain'. For example, the AMC technique and the Channel-Sensitive Scheduling method each are a method of applying an appropriate modulation and coding scheme at the most-efficient time determined depending on the partial channel state information fed back from a receiver.

There have been many researches done to adopt Orthogonal Frequency Division Multiple Access (OFDMA) to next generation communication systems in place of Code Division Multiple Access (CDMA) that has been used in $2^{nd}$ and $3^{rd}$ Generation mobile communication systems. The standardization organizations such as 3GPP, 3GPP2, and IEEE are developing standards for enhanced system based on the OFDMA or modified OFDMA. It is known that OFDMA promises to increase system capacity as compared to CDMA. One of the factors affecting the increase of system capacity in an OFDMA system is the use of frequency domain scheduling. As the channel sensitive scheduling technique uses the time-varying channel for capacity gain, it is possible to increase the capacity gain with frequency-varying channel characteristic.

FIG. 1 is a diagram illustrating a subframe structure in downlink of the convention LTE system.

Referring to FIG. 1, a subframe 115 is composed of 14 OFDM symbols 100~113 of which first three OFDM symbols 100~102 are the region allocated for Physical Downlink Control Channel (PDCCH) and the rest OFDM symbols 103~113 are the region allocated for Physical Downlink Shared Channel (PDSCH). The PDCCH is transmitted in the PDCCH region 100~102 across entire system band while the PDSCH is transmitted on Resource Block (RB) 114 as a basic unit of scheduling. Here, each RB is composed of 12 subcarriers, and the total number of the RBs varies according to the system bandwidth. The reason why the PDCCH region is arranged at the beginning of the subframe is for the UE to check the PDCCH first and, if no data is addressed to the UE, enters a micro sleep mode to save the UE's power consumption.

FIG. 2 is a diagram illustrating transmission format of downlink common reference signal (CRS) for 4 transmit antennas in the convention LTE system.

Referring to FIG. 2, a Resource Element (RE) means a subcarrier 203 in one OFDM symbol 201, and an RB 202 is composed of 12×14 REs. The receiver receives CRSs 210~213 corresponding to the respective antennas 204~207 to estimate the channel states of the respective transmit antennas 204~207. For this purpose, the each antenna transmits null signal 208 at RE region on which the other antennas transmit CRSs. That is, the antenna port 0 204 transmits null signal 208 at the RE positions of the CRS 211~213 transmitted by other antenna ports 1-3 205~207. In one RB 202, the CRSs 210 and 211 for the antenna port 0 204 and antenna port 1 205 are transmitted on 8 REs respectively while the CRSs 212 and 213 for the antenna port 2 206 and the antenna port 3 207 are transmitted on 4 REs respectively. Accordingly, in 4-antenna case, the CRSs are transmitted using 24 REs per RB 202. The receives estimates channel using the CRS and uses the PDSCH 209 in demodulation or generating downlink channel state information. Here, if the usage of the CRS is restricted to downlink channel state information other than channel estimation for demodulation, it may possible to reduce the number of REs for CRS transmission in one RB 202. This is because the channel estimation error in demodulation is less than the error required in generating downlink channel state information.

The receiver receives the CRS as depicted in FIG. 2 in all of the RBs in every subframe and generates a Rank Indicator (RI), a Channel Quality Indicator (CQI), and a Precoding Matrix Indicator (PMI) representing the downlink channel state.

FIG. 3 is a diagram illustrating uplink periodic feedback format in the conventional LTE system.

Referring to FIG. 3, the UE sends the eNB the RI, CQI, and PMI indicating channel status. In FIG. 3, the parameters P(=Np), K, M, and O determining the feedback format are transmitted to the UE through higher layer signaling and defined and ranged, respectively, as follows.

K: number of representative sub-bands for CQI report, K{1, 2, 3, 4},

O: offset at RI report timing and CQI/PMI report timing, {0, −1, . . . , −(P−1), −P}

M=$M_{RI}$: RI report period, M {1, 2, 4, 8, 16, 32, OFF},

Np, $N_{OFFSET,CQI}$: period and offset for sub-band CQI feedback, determined by cqi-pmi-ConfigurationIndex MRI, $N_{OFFSET,RI}$: RI report period and offset, determined by ri-ConfigurationIndex.

Here, the sub-band means a group of one or more consecutive RBs. The time-sensitive sub-band CQI feedback period 302 is shorter than the periods of the RI 303 and wideband CQI/PMI feedback 305. Since the sub-band CQI feedback has to be performed for all of the K representative sub-bands in the J frequency band regions, the CQI feedbacks for entire J*K sub-bands are performed when the wideband CQI/PMI feedback occurs at a time as denoted by reference number 304 such that the wideband CQI/PMI feedback period becomes (J*K+1)*P 300 and 301. Since it is not sensitive to time, the RI is fed back at longest period with offset O 306 to avoid transmission collision with other feedback informations.

FIG. 4 is a diagram illustrating downlink reference signal transmission and uplink feedback format in the LTE-Advanced (LTE-A) system.

Referring to FIG. 4, the Channel State Information Reference Signal (CSI-RS) 402 and 403 for downlink channel state estimation are transmitted at frame period 404. That is, the CSI-RS is transmitted at one of 10 subframes constituting the frame 400 or 401. The reason why the CSI-RS is transmitted in this way is because it is used only for the purpose of downlink channel state estimation as aforementioned. Upon receipt of the CSI-RS 402 and 403, the UEs 407~409 perform feedback of the corresponding channel status informations in uplink after elapse of the minimum calculated time 410 and 411 required for generating the downlink channel status informations as denoted by reference number 412~414. At this time, due to the long CSI-RS transmission period 404, the receiver feeds back several sub-band channel status informations and wideband channel status information in the transmission period, and the eNB determines the offset of the downlink channel status used in the eNB according to when the UE feeds back which information. Accordingly, it is necessary to design the uplink feedback format in consideration of the characteristics of the channel status information fed back. Also, in case that multiple UEs perform feedback immediately after channel estimation with CSI-RS to reduce the offset of the channel status, uplink overhead may be concentrated in a subframe. There is therefore a need of a design of a feedback format for distributing uplink feedback overhead while maintaining the offsets of the channel status informations fed back by multiple UEs evenly.

DISCLOSURE OF INVENTION

Technical Problem

An embodiment of the present invention proposes a method for determining a feedback order of the channel status informations in consideration of the time-varying feedback information characteristics, in case that the reference signal for downlink channel estimation is transmitted at long period, and transmitting the feedback information cyclically in a wireless communication system. That is, an embodiment of the present invention provides a method and apparatus for designing uplink periodic feedback format that is capable of distributing the overhead caused by the feedbacks of multiple UEs in view of the system while reducing the offset between the downlink channel status fed back from the UE and the channel status at the timing the data transmission to the UE when the period of the reference signal transmitted for downlink channel status estimation is long in the wireless communication system.

Solution to Problem

In accordance with an embodiment of the present invention, a method for transmitting feedback information in a communication system includes a step of generating a first feedback information, a step of transmitting the first feedback information at a first time point in a first period; a step of generating a second feedback information; and a step of transmitting the second feedback information at a second time point in a second period, wherein the first and second time points are different from each other from the view point of start points of the first and second periods.

Preferably, the feedback information is calculated based on channel status information reference signal (CSI-RS) transmitted at a predetermined time period. The first time point is closer than the second time point to the start time point of the first and second periods when the first feedback information is sub-band channel status information (SB-CSI) and the second feedback information is wideband channel status information (WB-CSI). The feedback information is transmitted by a terminal which receives the feedback transmission pattern information from a base station, generates the feedback information, determines a subframe for feedback transmission based on the feedback transmission pattern, and transmits the feedback information to the base station. The feedback transmission period is configured based on a CSI-RS transmission period.

In accordance with another embodiment of the present invention, a method for receiving feedback information in a communication system includes a step of receiving a first feedback information at a first time point in a first period; and a step of receiving a second feedback information at a second time point in a second period, wherein the first and second time points are different from each other from the view point of start points of the first and second periods.

In accordance with another embodiment of the present invention, an apparatus for transmitting feedback information in a communication system includes a controller which controls generating a first feedback information, transmitting the first feedback information at a first time point in a first period, generating a second feedback information, and transmitting the second feedback information at a second time point in a second period; and a transceiver which transmits the first and second feedback informations generated by the controller, wherein the first and second time points are different from each other from the view point of start points of the first and second periods.

In accordance with still another embodiment of the present invention, an apparatus for receiving feedback information in a communication system includes a receiver which receives a first feedback information at a first time point in a first period and a second feedback information at a second time point in a second period; and a controller which analyzes the first and second feedback informations to check downlink channel status, wherein the first and second time points are different from each other from the view point of start points of the first and second periods.

Advantageous Effects

As described above, the present invention proposes a method for determining the feedback order of the channel status informations in consideration of the feedback information characteristic to time variation and transmits and transmitting the feedback informations in cyclical manner when the reference signal for downlink channel estimation is transmitted at long period. Through this, it is possible to reduce the offset of the channel status used by the eNB and acquire the channel status offset performance for multiple feedback informations uniformly. The cell-specific feedback pattern length and the UE-specific feedback transmission pattern configuration method proposed in the present invention is capable of managing the system efficiently by distributing the overhead of the feedbacks generated by multiple UEs in view of the system and maintaining fairness in view of the per-UE channel status offset performance.

DETAILED DESCRIPTION OF EXEMPLARY EMBODIMENTS

Figure 1:
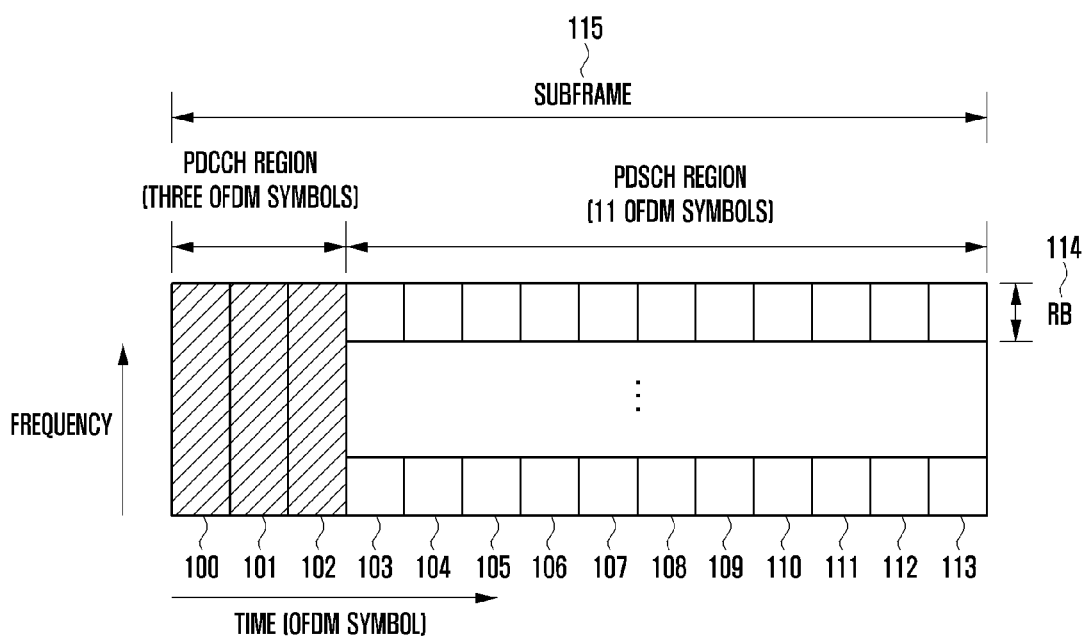
FIG. 1 is a diagram illustrating a subframe structure in downlink of the convention LTE system.
Figure 2:
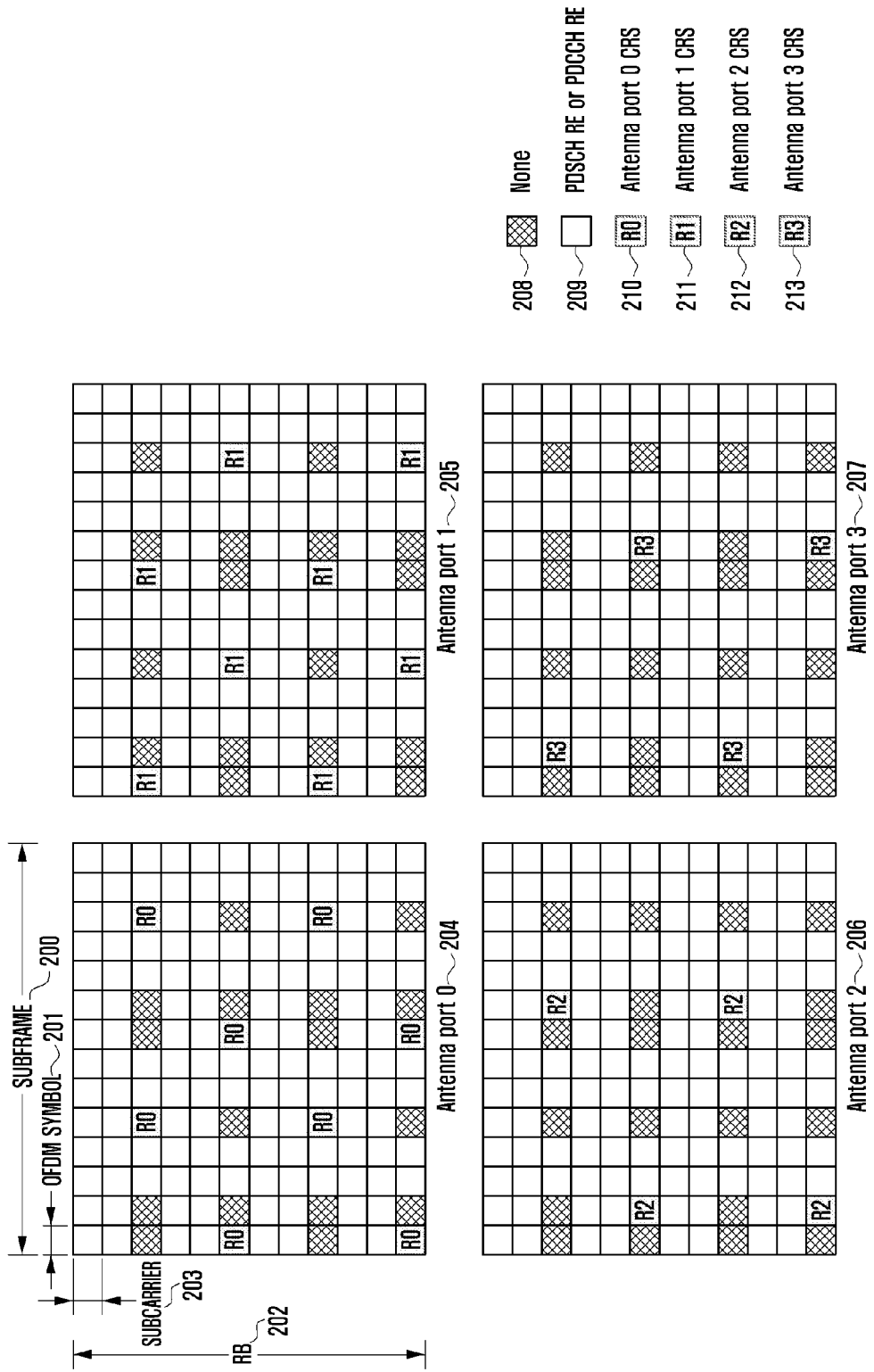
FIG. 2 is a diagram illustrating transmission format of downlink common reference signal (CRS) for 4 transmit antennas in the convention LTE system.
Figure 3:
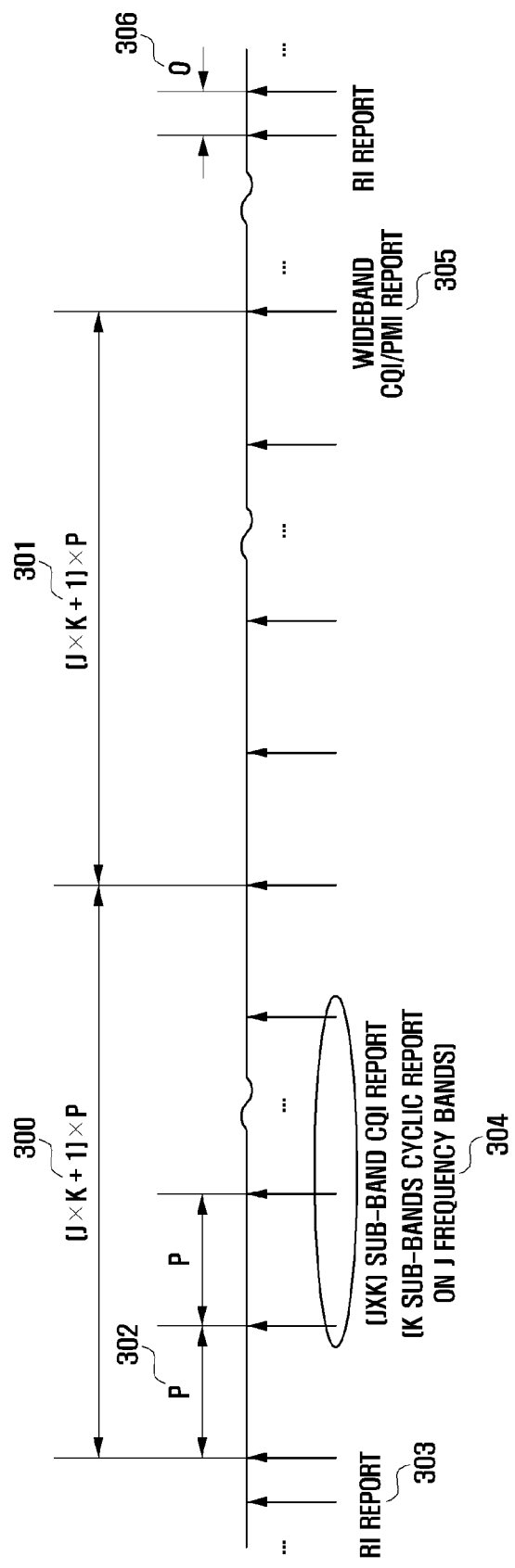
FIG. 3 is a diagram illustrating uplink periodic feedback format in the conventional LTE system.
Figure 4:
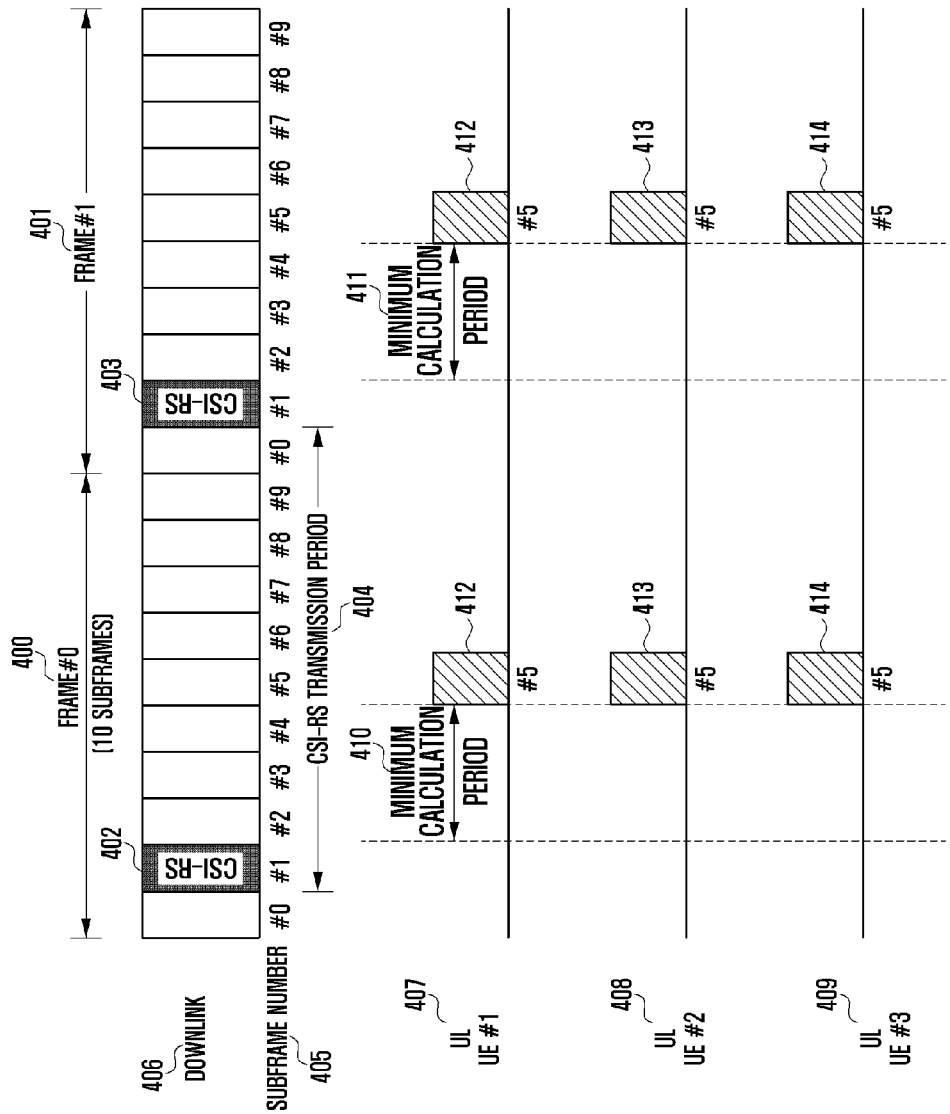
FIG. 4 is a diagram illustrating downlink reference signal transmission and uplink feedback format in the LTE-Advanced (LTE-A) system.

Exemplary embodiments of the present invention are described with reference to the accompanying drawings in detail. Detailed descriptions of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Although the embodiments of the present invention are directed to the OFDM-based radio communication system, especially 3GPP EUTRA standard, it will be understood to those skilled in the art that the present invention can be applied even to other communication systems having the similar technical background and channel format, with a slight modification, without departing from the spirit and scope of the present invention.

In the downlink of a radio communication system, the eNB uses the downlink channel state information of the UEs for link-adaptive transmission to the UEs. The channel status information is generated by the UE on the basis of the reference signal transmitted in downlink and fed back to the eNB through an uplink control channel. Accordingly, the increase of the reference signal transmission period and channel status information feedback period increases the offset between the channel status fed back from the UE and the channel status at the time when the data is actually transmitted to the UE, resulting in transmission inefficiency and degradation of system performance. The present invention proposes a method and apparatus for configuring uplink periodic feedback format that is capable of reducing the channel status offset, especially when the reference signal for downlink channel status estimation is transmitted at a long period, and distributing feedback overhead of the UEs from the view point of the system.

In the following description, the terms "period" and "window" are used interchangeably in association with the feedback transmission period. As shown in drawings of the present invention, the feedback pattern is determined by the period or the window and period or the offset between the start time of the window and the time when the feedback is transmitted.

The first embodiment of the present invention proposes a feedback format designed in consideration of the time-varying characteristic of the channel status information to reduce the channel status offset. The sub-band channel status information (SB-CSI) is the channel status information representing the sub-band and sensitive to time variation as compared to the wideband channel status information (WB-CSI). Accordingly, the channel status offset caused by the delay of the SB-CSI feedback is likely to be greater than that of the WB-CSI feedback delay. The present invention proposes a method for performing the time variation-sensitive SB-CSI feedback prior to the WB-CSI feedback by taking notice of these characteristics of the channel status information. Also, the present invention proposes a cyclic transmission method of multiple sub-bands at every feedback period to avoid sub-band channel estimation offset irregularity caused when SB-CSI for multiple sub-bands are transmitted across multiple subframes.

The second embodiment of the present invention proposes cell-specific feedback transmission pattern length and a method for configuring sell specific feedback transmission pattern that is capable of distributing overhead of the feedback transmitted by multiple UEs in view of the system. In order to maintain fair feedback transmission among the UEs, the feedback transmission patterns of the respective UEs are configured such that the UEs use the feedback resources available in the pattern length fairly.

The third embodiment of the present invention proposes cell-specific feedback transmission pattern length and a feedback window for UE-specific feedback transmission pattern configuration that is capable of distributing the overhead of feedback from multiple UEs in view of the system. This feedback window is capable of avoiding redundancy of feedback for subframe duration from the CSI-RS measurement time to the feedback information generation completion time and managing the feedback resources of the multiple UEs efficiently in view of the system.

A description is made of the method and apparatus for configuring periodic uplink feedback format of downlink channel status information according to embodiments of the present invention.

First Embodiment

Figure 5:
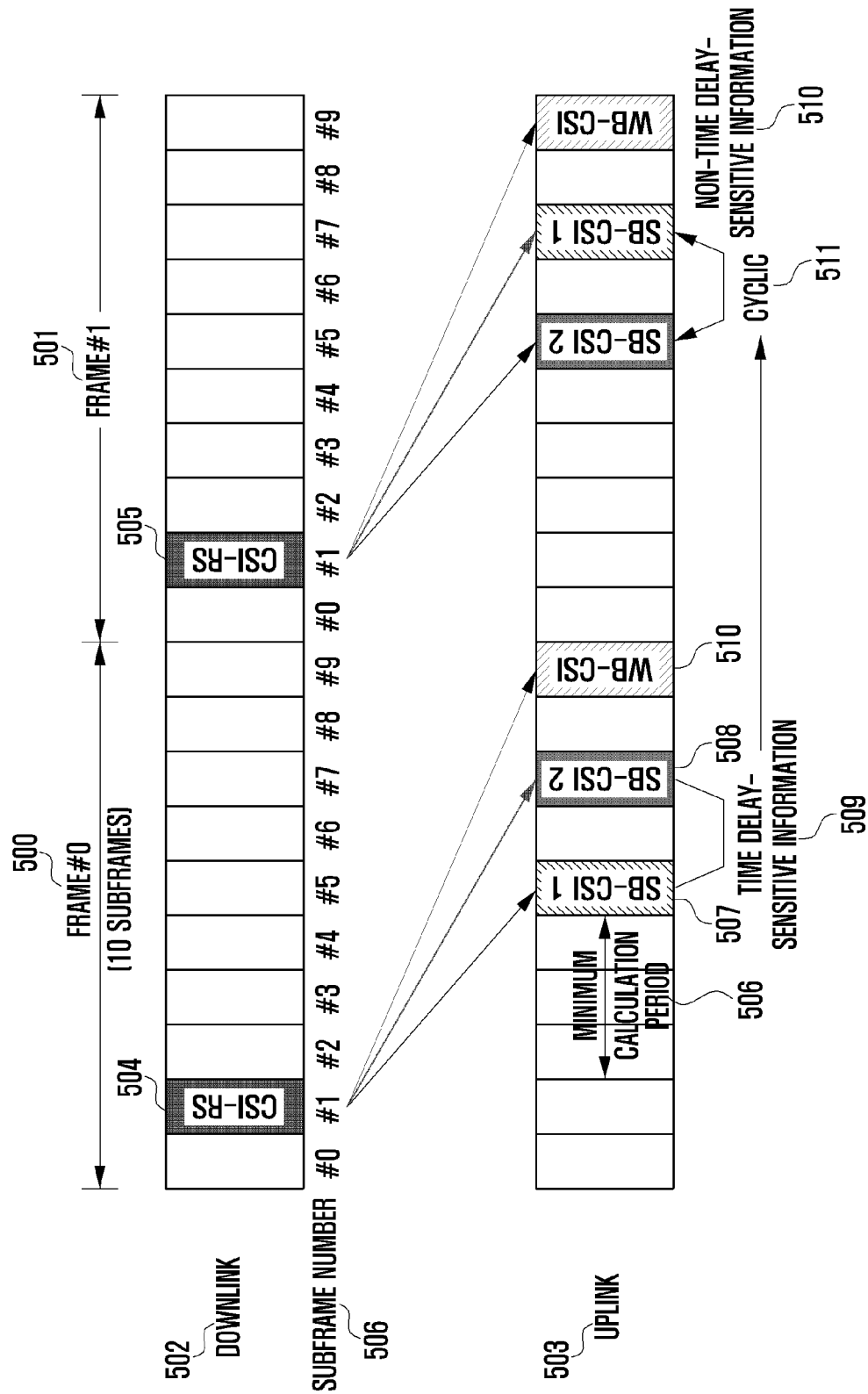
FIG. 5 is a diagram illustrating a periodic uplink feedback format and method of a UE according to the first embodiment of the present invention.

FIG. 5 is a diagram illustrating a periodic uplink feedback format and method of a UE according to the first embodiment of the present invention.

Referring to FIG. 5, it is assumed that the CSI-RS 504 and 505 for channel status estimation is transmitted in the second subframe of each frame 500 and 501 in downlink. In case that the CSI-RS transmission period is long, the UE performs channel estimation and then transmits the generated multiple channel status informations (e.g. multiple sub-band CQIs and wideband CQI/PMI informations) to the eNB across multiple subframes periodically through uplink feedback channel. At this time, as the uplink feedback timing becomes far from the downlink channel estimation timing, the offset between the channel status used by the eNB and the channel status at the actual data transmission timing increases. In order to minimize this offset, it is preferred to consider the time-varying characteristic of the channel status information. In the first embodiment of the present invention, the feedback format of the UE is designed as shown in FIG. 5.

The sub-band channel status information (SB-CSI) 507 and 508 is the channel status information representing the sub-band which is sensitive to the time variation as compared to the wideband channel status information (WB-CSI) 510. Accordingly, the channel status offset caused by the delay of SB-CSI feedback is likely to be greater than that caused by the delay of WB-CSI feedback. The present invention proposes a method for performing the SB-CSI feedback sensitive to the time variation prior to the WB-CSI feedback by taking notice of such channel status information characteristic. In order to preventing the irregularity of the sub-band channel estimation offsets caused when a plurality of SB-CSIs of multiple sub-bands are transmitted across a plurality of subframes, a method for transmitting the multiple feedbacks cyclically at every feedback period is proposed. That is, in case that SB-CSI 1 and SB-CSI 2 for two sub-bands are fed back as shown in FIG. 5, the UE performs feedback in order of SB-CSI 1 507, SB-CSI 2 508, and WB-CSI 510 at a regular interval in the frame #0 while, in frame #1 501, order of SB-CSI 2 511, SB-CSI 1 511, and WB-CSI 510 at a regular interval. Here, the SB-CSI 1 507, SB-CSI 2 508, and WB-CSI 510 are transmitted at a period shorter than that of the CSI-RS.

Second Embodiment

Figure 6:
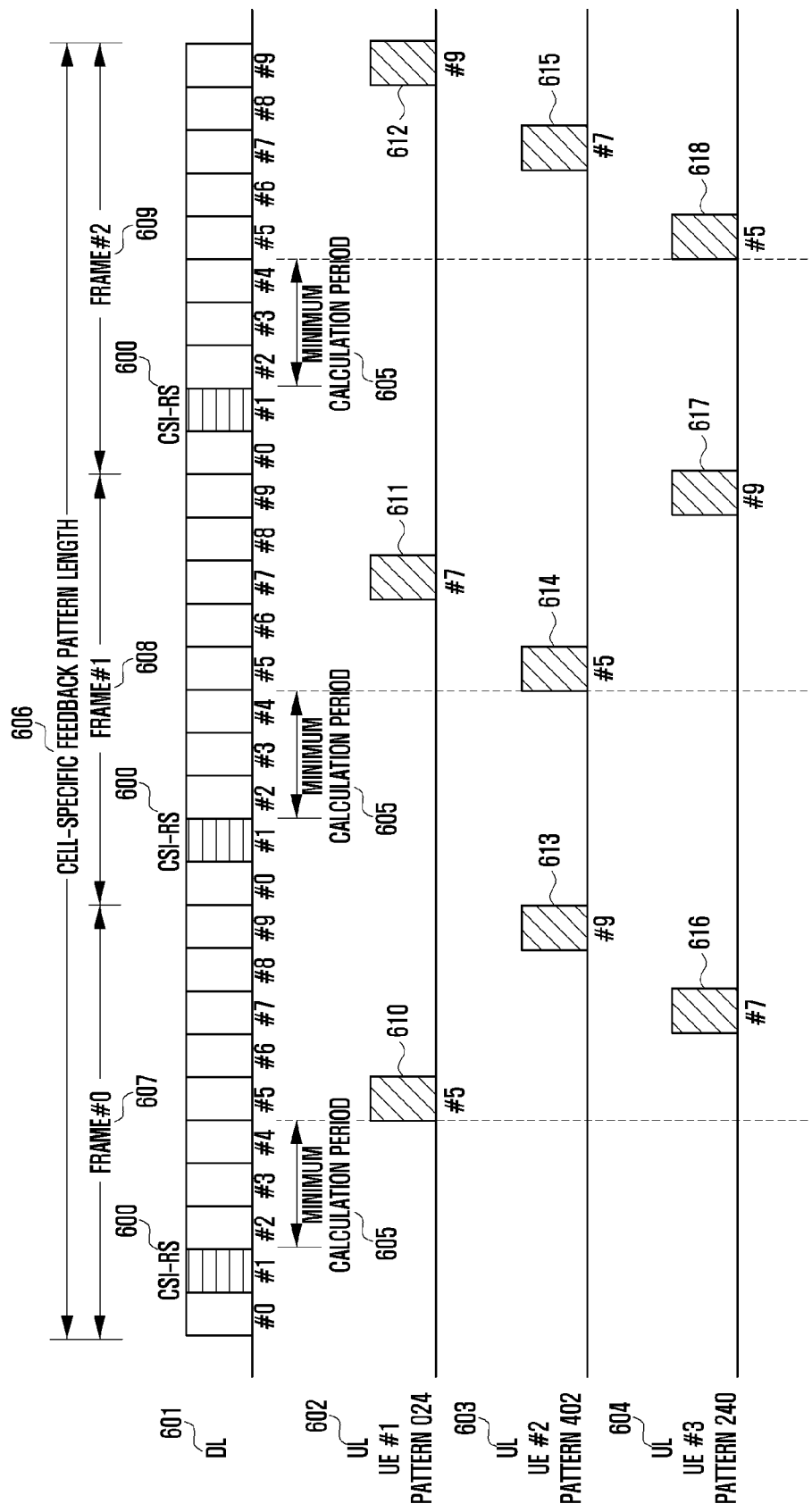
FIG. 6 is a diagram illustrating an uplink feedback format and method for multiple UEs according to the second embodiment of the present invention.

FIG. 6 is a diagram illustrating an uplink feedback format and method for multiple UEs according to the second embodiment of the present invention.

Referring to FIG. 6, in order to distribute the overhead of the feedback transmitted by multiple UEs in view of the system, the second embodiment of the present invention proposes a cell-specific feedback transmission pattern length 606 and UE-specific feedback transmission patterns 602~604. As the number of UEs increases, the feedback transmission pattern length 606 increases to distribute the feedback overhead evenly and maintain the average uniformity of the channel estimation offsets. The feedback transmission pattern of the UEs is configured such that the UEs use the feedback resources available in the length of the pattern fairly. This is to maintain feedback transmission fairness among the UEs.

FIG. 6 shows the feedback transmission patterns 602~604 when the cell-specific feedback pattern length is 3 frames and the transmission of the CSI-RS 500 occurs at every second subframe. If CSI-RS 600 is received, each UE performs feedback transmission during the feedback pattern length in the predetermined pattern after a minimum calculation time 605 for channel estimation has elapsed. The UE#1, UE#2, and UE#3 perform the feedback transmission in different patterns within the cell-specific feedback pattern lengths as denoted by reference numbers 602, 604, and 606 respectively. Here, the number of each pattern denotes a subframe number of the subframe after the minimum calculation period 605 as start point. In this case, the UE #1 transmitting in the pattern 024 (change pattern of subframe carrying feedback information) performs feedback at the subframe #5 610 of the frame #0 607 (pattern 0: $0^{th}$ subframe after minimum calculation period), the subframe #7 611 of the frame #1 608 (pattern 2: second subframe after minimum calculation period), and the subframe #9 612 of the frame #2 609. The pattern of each UE may be generated through cyclic shift of a pattern determined by the UE. In case of the UE#1, the number of the subframe carrying the channel status information is repeated cyclically in such a way of subframe #5, #7, #9, #5, . . . as denoted by reference number 602. Accordingly, the UE#1 performs feedback at the subframe #5 of the frame #0 in the $0^{th}$ change pattern, at the subframe #7 of the frame #1 in the second change pattern, and at the subframe #9 of the frame #2 in the fourth change pattern. By shifting the pattern 024 of the UE#1 cyclically, it is possible to determine the feedback patterns of other UEs. That is, 4 at the last digit is shifted to the first digit position in the pattern 024 so as to be pattern 402, and in the same manner, the pattern 402 of the UE#2 is shifted cyclically to generate the pattern 240 of the UE#3. This is accomplished by the method in which the eNB transmits to the UEs the cell-specific feedback transmission pattern length and UE-specific feedback transmission pattern which are designed to distribute the overhead of the feedback transmitted by multiple UEs in view of the system.

Third Embodiment

Figure 7:
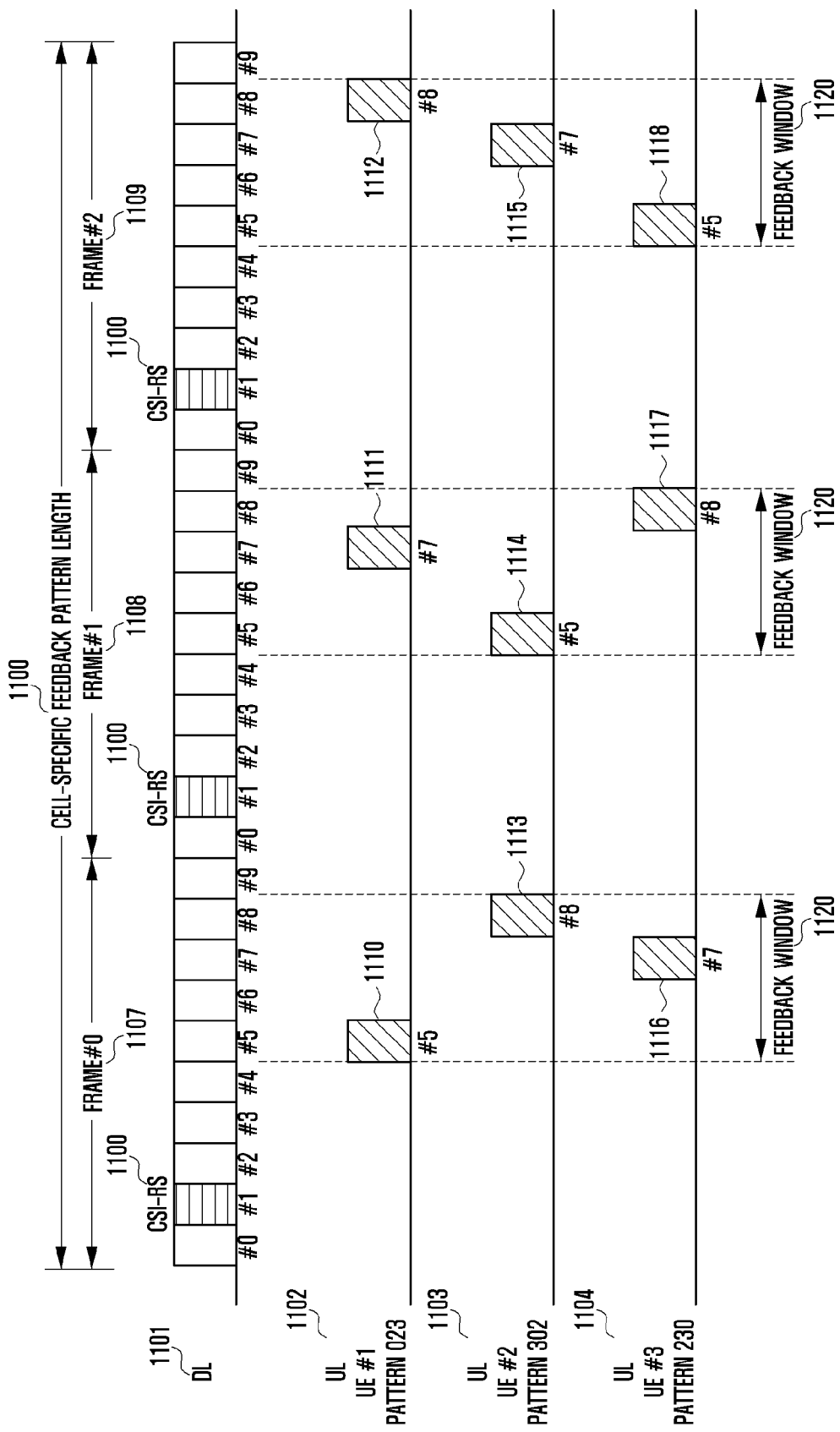
FIG. 7 is a diagram illustrating a feedback window-based uplink feedback format and method for multiple UEs according to the third embodiment of the present invention.

FIG. 7 is a diagram illustrating a feedback window-based uplink feedback format and method for multiple UEs according to the third embodiment of the present invention.

Referring to FIG. 7, the third embodiment of the present invention uses a feedback window to distribute the overhead of the feedback transmitted by multiple UEs in view of the system. That is, the cell-specific feedback transmission pattern length 1106 and the UE-specific feedback transmission patterns 1102~1104 are configured using the feedback window 1120. The feedback window 1120 is capable of preventing the redundancy of the feedback transmitted for the subframe duration from the CSI-RS measurement time to the feedback information generations completion time and managing feedback resources of the multiple UEs efficiently.

The feedback transmission patterns 1102~1104 of the UEs are configured such that the UEs use the feedback resources available in the feedback pattern length 1106 fairly. At this time, the feedback transmission patterns 1102~1104 are configured in the feedback window 1120. The size of the feedback window cannot be longer than the CSI-RS transmission period and may be set to the same value for the respective frames 1107~1109. Also, the start frame of the feedback window 1120 may be set to the same value or different values for the respective frames 1107~1109 in the range of the transmission pattern length 1106.

Although FIG. 7 shows an example where the CSI-RS transmission period is set to one frame, the CSI-RS transmission period may be shorter or longer than that and thus the frame (equal to 10 subframes) as a basic unit of the transmission pattern length as specified above may be short or long. In addition, the size of the feedback window 1120 and the feedback start subframe may be set to the same value or different values for respective UEs. The size of the feedback window 1120 in the transmission pattern length and the start subframe number may be transmitted to the UE through higher layer signaling or broadcast to all of the UEs through higher layer signaling. Also, the feedback transmission patterns of the UEs may be transmitted to the respective UEs through higher layer signaling.

FIG. 7 is directed to the feedback transmission patterns 1102~1104 of the respective UEs in case that the cell-specific feedback pattern length is 3 and the CSI-RS 1100 is transmitted at every second subframe. After receiving the CSI-RS 1100, each UE estimates a channel and perform feedback transmission within the feedback window 1120 determined during the feedback pattern length 1106 according to a predetermined pattern. Here, the feedback window 1120 may be configured based on the size of the feedback window and the start subframe number received through higher layer signaling, and the feedback transmission pattern is determined in the predetermined feedback window 1120. For example, the UE#1 may use the pattern 023 (changed pattern of subframe carrying feedback information) as denoted by reference number 1102. Here, the feedback pattern 023 means the subframe number assuming the case where the subframe #5 is determined as the start timing. In this case, the UE#1 performs feedback at the subframe #5 1110 (pattern 0: subframe #5) of the frame #0 1107, the subframe #7 1111 (pattern 2: second subframe after subframe #5) of the frame #1 1108, and the subframe #8 1112 (pattern 4: third subframe after subframe #5) of the frame #2 1109. If a feedback pattern is selected by a certain UE, the feedback patterns of other UEs are generated by shifting the determined pattern cyclically. That is, in case of the UE#1, the number of the subframe carrying the channel status information is repeated cyclically in order of subframe #5, #7, #8, #5, ... as shown in FIG. 7. Accordingly, the UE#1 performs feedback at the subframe #5 of the frame #0 in the $0^{th}$ change pattern, at the subframe #7 of the frame #1 in the second change pattern, and at the subframe #8 of the frame #2 in the third change pattern. By shifting the pattern 023 of the UE#1 cyclically, 3 at the last bit is shifted to the first digit position so as to be pattern 302, and in the same manner, the pattern 302 of the UE#2 is shifted cyclically to generate the pattern 230 of the UE#3. This method makes possible for the UEs to use the feedback resources fairly. Also, the pattern of the corresponding UE may be determined using a unique UE ID-based random variable generator, and the pattern of the UE may be updated at a feedback pattern length period or a period longer than that.

Figure 8:
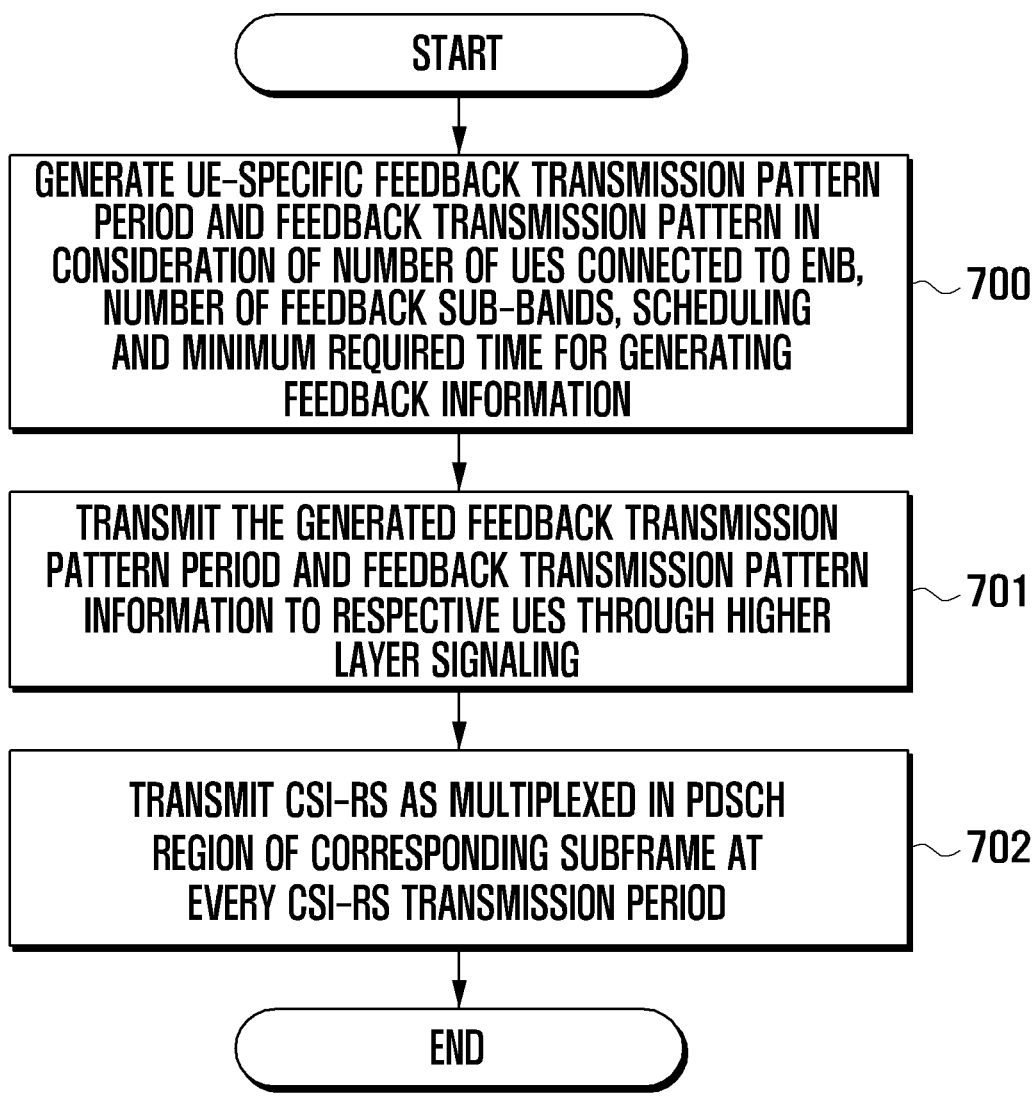
FIG. 8 is a flowchart illustrating an eNB procedure for transmitting CSI-RS according to an embodiment of the present invention.

FIG. 8 is a flowchart illustrating an eNB procedure for transmitting CSI-RS according to an embodiment of the present invention.

Referring to FIG. 8, the eNB generates UE-specific feedback transmission pattern period and feedback transmission pattern in consideration of a number of UEs connected to the eNB, a number of feedback sub-bands, scheduling characteristic, and minimum required time for generating feedback information at step 700. Next, the eNB transmits the generated feedback transmission pattern period and feedback transmission pattern information to the respective UEs through higher layer signaling at step 701. Here, the feedback transmission pattern period and pattern information may be formatted as shown in FIG. 5, 6, or 7. That is, as shown in FIG. 5 according to the first embodiment, in order to perform the SB-CSI feedback sensitive to time variation prior to the WB-CSI feedback and avoid the non-uniformity of the sub-band channel estimation offset, the feedback transmission pattern period and pattern information can be generated such that the feedbacks of the multiple sub-bands are transmitted cyclically at every feedback period. As shown in FIG. 6 of the second embodiment and FIG. 7 of the third embodiment, the cell-specific feedback pattern length and UE-specific feedback transmission patterns can be generated to distribute the overhead of the feedbacks transmitted by multiple UEs in view of the system. Afterward, the eNB transmits the CSI-RS as multiplexed in the PDSCH region of the corresponding subframe at every CSI-RS transmission period.

After transmitting the CSI-RS, the eNB may receive feedback information transmitted by the UE and analyze the downlink channel status. At this time, the eNB receives the first feedback information at the first timing of the first period and the second feedback information at the second timing of the second period. At this time, the first and second timings are the time points with different distances from the start points of the first and second period.

Here, the feedback information is the information calculated by the UE based on the CSI-RS transmitted by the eNB at a predetermined interval and fed back to the eNB. If the first and second feedback informations are the respective SB-CSI and WB-CSI, the first time point is close to the start time of the first and second period as compared to the second time point. The eNB transmits the feedback transmission pattern information to the UE, and the UE generates the feedback information and transmits the feedback information in the subframe determined to transmit the feedback information based on the feedback transmission pattern such that the eNB receives the feedback information from the UE. The feedback transmission period is configured based on the CSI-RS transmission period.

Figure 9:
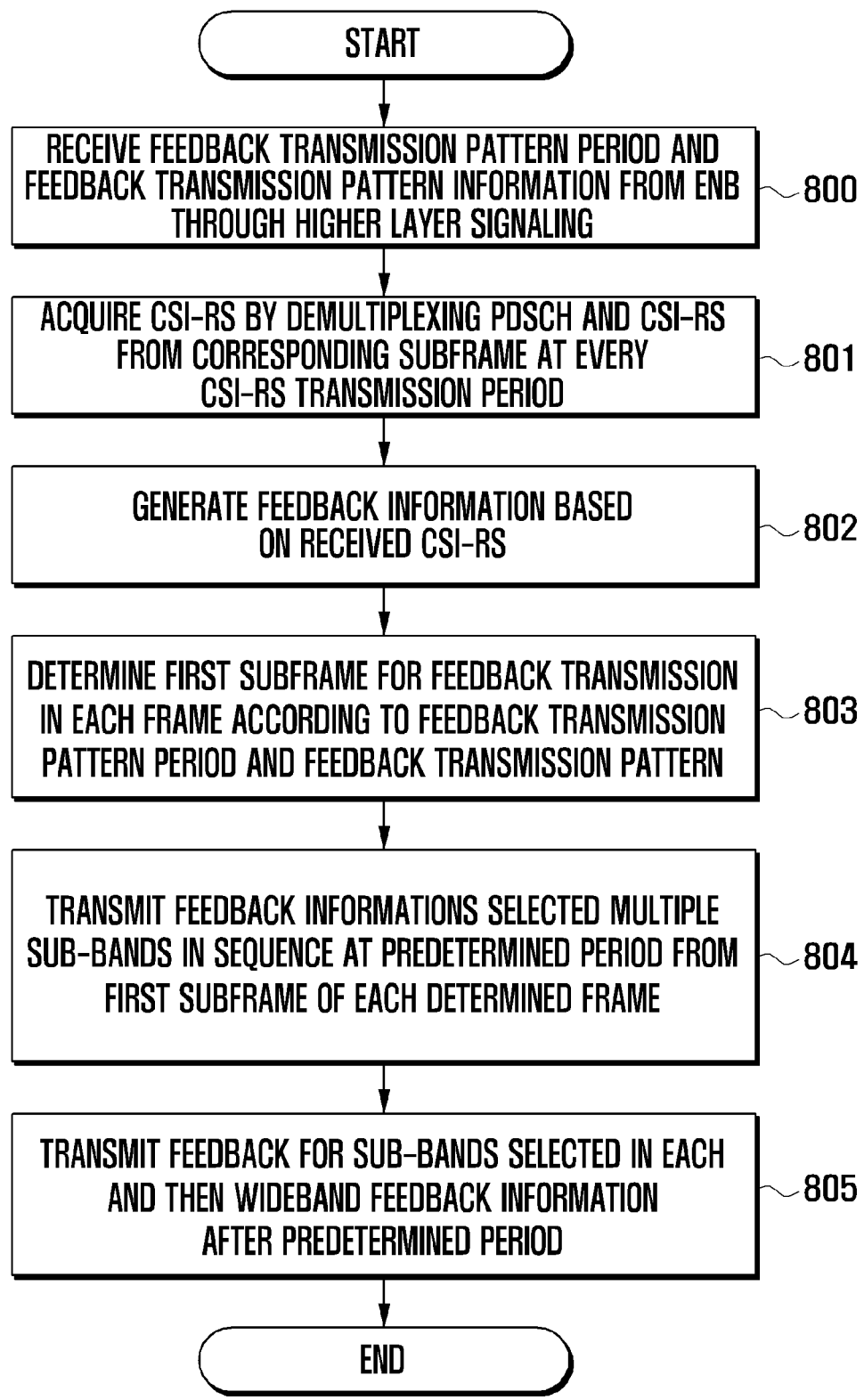
FIG. 9 is a flowchart illustrating transmission/reception procedure of the UE according to an embodiment of the present invention.

FIG. 9 is a flowchart illustrating transmission/reception procedure of the UE according to an embodiment of the present invention. Referring to FIG. 9, the UE receives the feedback transmission pattern period and feedback transmission pattern information transmitted by the eNB through higher layer signaling at step 800. Afterward, the UE receives the CSI-RS transmitted by the eNB at every subframe to generate the feedback information and feeds back the generated information to the eNB using the feedback transmission pattern period and feedback transmission pattern information.

In more detail, the UE demultiplexes the corresponding subframe into PDSCH and CSI-RS at every CSI-RS transmission period to acquire CSI-RS at step 801 and generates the channel status information for feedback based on the received CSI-RS at step 802. Afterward, the UE determines the first subframe for feedback transmission in each frame according to the feedback transmission pattern period and feedback transmission pattern at step 803. Next, the UE transmits the feedback informations for the selected multiple sub-bands through PUCCH in sequence at an interval from the first subframe of each frame, and the selected multiple sub-bands are adjusted in transmission order cyclically at every frame.

Afterward, the UE transmits the feedback information for the multiple sub-bands selected in each frame and then transmits the WB-CSI to the eNB through PUCCH after a predetermined period at step 805. Here, the predetermined period means the period for the feedback of the information on the multiple subframes generated at a measurement timing and wideband channel status information, and it is a short period in which all of the selected sub-band channel status informations and wideband channel status information can be transmitted in the CSI-RS transmission period or (CSI-RS transmission period+minimum calculation period). In this case, the UE may transmit the feedback information to the eNB according to the method of FIG. 5, 6, or 7.

In the first embodiment, the UE performs the SB-CSI feedback sensitive to time variation prior to the WB-CSI feedback and receives the feedback transmission pattern period and pattern information for cyclic transmission of multiple sub-bands at every feedback period to avoid non-uniformity of the sub-band channel estimation offsets at step 800. Afterward, the UE acquires the CSI-RS 504 of frame #0 from the downlink information transmitted by the eNB as shown in FIG. 5 at step 801 and generates feedback information and determines the first subframe for transmitting the feedback information at steps 802 and 803. Afterward, the UE transmits the time delay-sensitive feedback information (here, SB-CSI1 and SB-CSI2) first at step 804 and then transmits the non-delay sensitive feedback information (here, WB-CSI) at step 805. At this time, the UE adjusts the transmission order so as to transmit multiple sub-bands selected at step 804 cyclically at every frame (in case of FIG. 5, adjust the transmission order to transmit the informations in order of SB-CSI2 and SB-CSI1).

Afterward, if the CSI-RS 505 of the next frame #1 is received, the UE repeats steps 802-805 to transmit the feedback information to the eNB. At this time, the time-sensitive feedback information is transmitted first, and the time sensitive information is transmitted in adjusted transmission order. That is, the channel status informations are transmitted in order of SB-CSI1 and SB-CSI2 in the frame #0 while being transmitted in order of SB-CSI 2 and SB-CSI1 in the frame #1.

In the second embodiment, the eNB receives the feedback transmission period and feedback transmission pattern information from the eNB. Afterward, the UE acquires CSI-RS at every CSI-RS transmission period and generates the feedback information based on the received CSI-RS as shown in FIG. 6. Next, the UE determines the first subframe for feedback transmission according to the received feedback transmission pattern period and feedback transmission pattern information. At this time, the UE#1 has the transmission pattern "024" and the UE#2 the transmission pattern "402" as shown in FIG. 6. After the minimum calculation period has elapsed since the receipt of the CSI-RS, the pattern#0 becomes subframe #5, pattern 2 the subframe #7, and pattern 4 the subframe #9. Accordingly, as shown in FIG. 6, the UE#1 transmits the feedback information at the subframe #5, the UE#2 at the subframe #9, and the UE#3 at the subframe #7, in the frame #0. Altos, the UE#1 transmit the feedback information at the subframe #7, the UE#2 at the subframe #5, and UE#3 at the subframe #9, in the frame #1. Also, the UE#1 transmits the feedback information at the subframe #9, the UE#2 at the subframe #7, and the UE#3 at the subframe #5, in the second frame.

Accordingly, when the UE#1-UE#3 transmit the feedback informations in the respective frames, the feedback informations are transmitted in distributed fashion as shown in FIG. 6. This is accomplished by the method in which the eNB transmits the cell-specific feedback transmission pattern length and UE-specific feedback transmission pattern, which are designed to distribute the overhead of the feedback transmitted by multiple UEs in view of the system, to the UEs.

In the third embodiment, receives the feedback transmission pattern period and the feedback transmission pattern information configured within the feedback window. Afterward, the UE acquires CSI-RS at every CSI-RS transmission period and generates feedback information based on the received CSI-RS as shown in FIG. 7. Next, the UE determines the first subframe for feedback transmission according to the received feedback transmission pattern period and the feedback transmission pattern information. In case of FIG. 6, the UE#1 has the pattern "023", the UE#2 the pattern "302", and the UE#3 the pattern 230; and these patterns exist within in the feedback window as shown in FIG. 7. If a transmission timing arrives after the receipt of the CSI-RS (here, the transmission timing may be the time of channel estimation with received CSI-RS, i.e. minimum calculation period in the second embodiment), the pattern 0 becomes the subframe #5, the pattern 2 the subframe #7, and the pattern 3 the subframe #8. Accordingly, as shown in FIG. 6, the UE#1 transmits the feedback information at the subframe #5, the UE#2 at the subframe #8, and the UE#3 at the subframe #7, in the frame #0. In the frame #1, the UE#1 transmits the feedback information at the subframe #7, the UE#2 at the subframe #5, and the UE#3 at the subframe #9. In the frame #2, the UE#1 transmits the feedback information at the subframe #8, the UE#2 at the subframe #7, and the UE#3 at the subframe #5.

Accordingly, when the UE#1-UE#3 transmit the feedback informations in the respective frames, the feedback informations are transmitted in distributed fashion as shown in FIG. 6. This is accomplished by the method in which the eNB transmits to the UEs the cell-specific feedback transmission pattern length and UE-specific feedback transmission pattern which are designed to distribute the overhead of the feedback transmitted by multiple UEs in view of the system.

As described above, the feedback information transmission method for a communication according to an embodiment of the present invention generates the first feedback information and transmits the first feedback information at the first time point of the first period. The method generates the second feedback information and transmits the second feedback information at the second timing of the second period. Here, it is shown that the first and second timings are time points distant from the respective starting points of the first and second periods.

Here, the feedback information is calculated based on the CSI-RS transmitted at a predetermined time interval. Assuming that the first and second feedback informations are the SB-CSI1 and WB-CSI respectively, the first time point close to the start time points of the first and second periods as compared to the second time point. The UE receives the feedback transmission pattern information from the eNB, generates feedback information, determines the subframe for feedback transmission based on the feedback transmission pattern, and transmits the feedback information to the eNB. The feedback transmission period is configured based on the CSI-RS transmission period.

Figure 10:
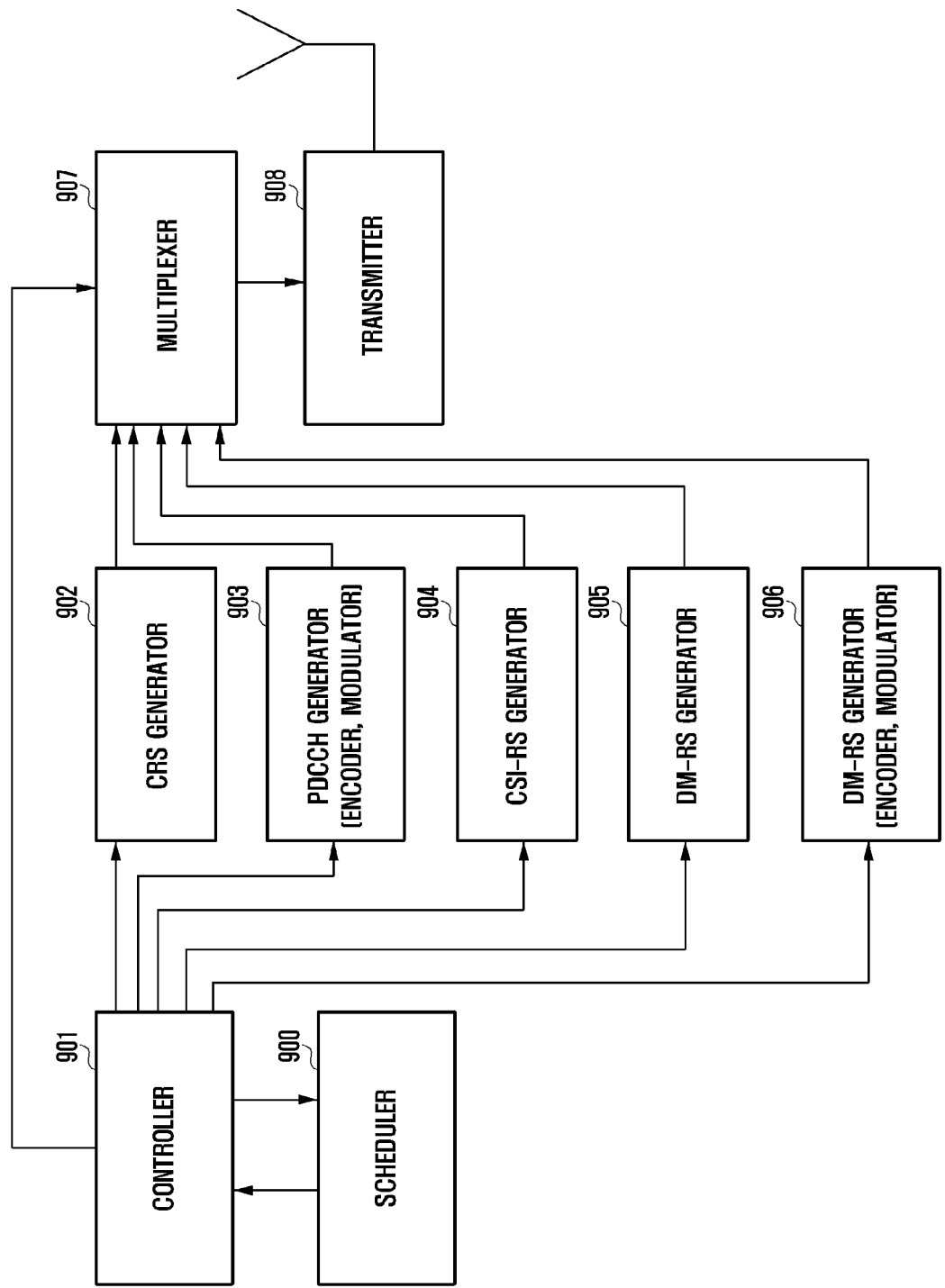
FIG. 10 is a block diagram illustrating a configuration of the eNB according to an embodiment of the present invention.

FIG. 10 is a block diagram illustrating a configuration of the eNB according to an embodiment of the present invention.

Referring to FIG. 10, the eNB scheduler 900 determines the UEs to allocate resource for PDCCH transmission and priorities of the respective UEs. The eNB scheduler 900 performs this operation based on the channel states reported by the respective UEs. The controller 901 operates to control the feedback procedure of the UEs as shown in FIG. 8.

The CRS generator 902 generates CRS as downlink common reference signal. The PDCCH generator 903 is provided with an encoder and a modulator and encodes and modulates the control information to generate subcarrier symbols to be transmitted on PDCCH. The CSI-RS generator 904 generates the channel status information reference signal (CSI-RS) for downlink channel status estimation. The PDSCH generator 906 encodes and modulates the information to generate subcarrier symbols to be transmitted on PDSCH. That is, the generators 90-906 generates the subcarrier symbols of CRS, PDCCH, CSI-RS, DM-RS (DeModulation-Reference Signal), and PDSCH channels under the control of the controller 901. The multiplexer 907 multiplexes the subcarrier symbols generated by the generators 902-906, under the control of the controller 901, and the transmitter converts the output of the multiplexer 907 to RF signal to be transmitted.

At this time, the controller 901 controls the multiplexer 907 to multiplex the subcarriers such that the CRS is mapped to PDCCH region and the CSI-RS and DM-RS to PDSCH region. This is because the CRS is used for channel estimation to demodulate PDCCH and the DM-RS for channel estimation to demodulate PDSCH and the CSI-RS for downlink channel status estimation. The controller 901 controls to multiplex the CSI-RS into PDSCH based on a predetermined CSI-RS transmission subframe number of transmission period.

The controller 901 controls such that the feedback transmission-related control informations including the feedback transmission pattern according to an embodiment of the present invention are transmitted through higher layer signaling (e.g. RRC signaling). Here, the feedback transmission-related control informations may be the patterns of the first to third embodiments as described above. The signaling informations may be transmitted through Broadcasting Channel (BCH). The controller 901 also controls the multiplexer 907 to multiplex the CSI-RS for downlink channel status estimation into PDSCH.

As described above, the eNB generates CSI-RS for downlink channel status estimation and transmits the CSI-RS as multiplexed into PDSCH. Although not shown, the eNB demultiplexes the feedback information received from the UE to check the channel status of the downlink channel. In this case, the device for receiving the feedback information in the eNB is composed of a receiver for receiving the first feedback information at first time point in the first period and the second feedback information at the second time point in the second period and a controller for analyzing the first and second feedback informations to check the downlink channel status, and the first and second time points distant differently from the start points of the first and second periods.

Here, the feedback information is calculated based on the channel status information reference signal (CSI-RS) transmitted at a predetermined period. The first feedback information is the sub-bands channel status information (SB-CSI), the second feedback information is the wideband channel status information (WB-CSI), and the first time point is close to the start points of the first and second period as compared to the second time point. The eNB receiving the feedback information may include a transmitter for transmitting the feedback transmission pattern information, a receiver for receiving the feedback information transmitted in the subframe determined based on the feedback transmission pattern, and a controller for analyzing the feedback information to check the downlink channel status. The feedback transmission period is configured based on the CSI-RS transmission period.

Figure 11:
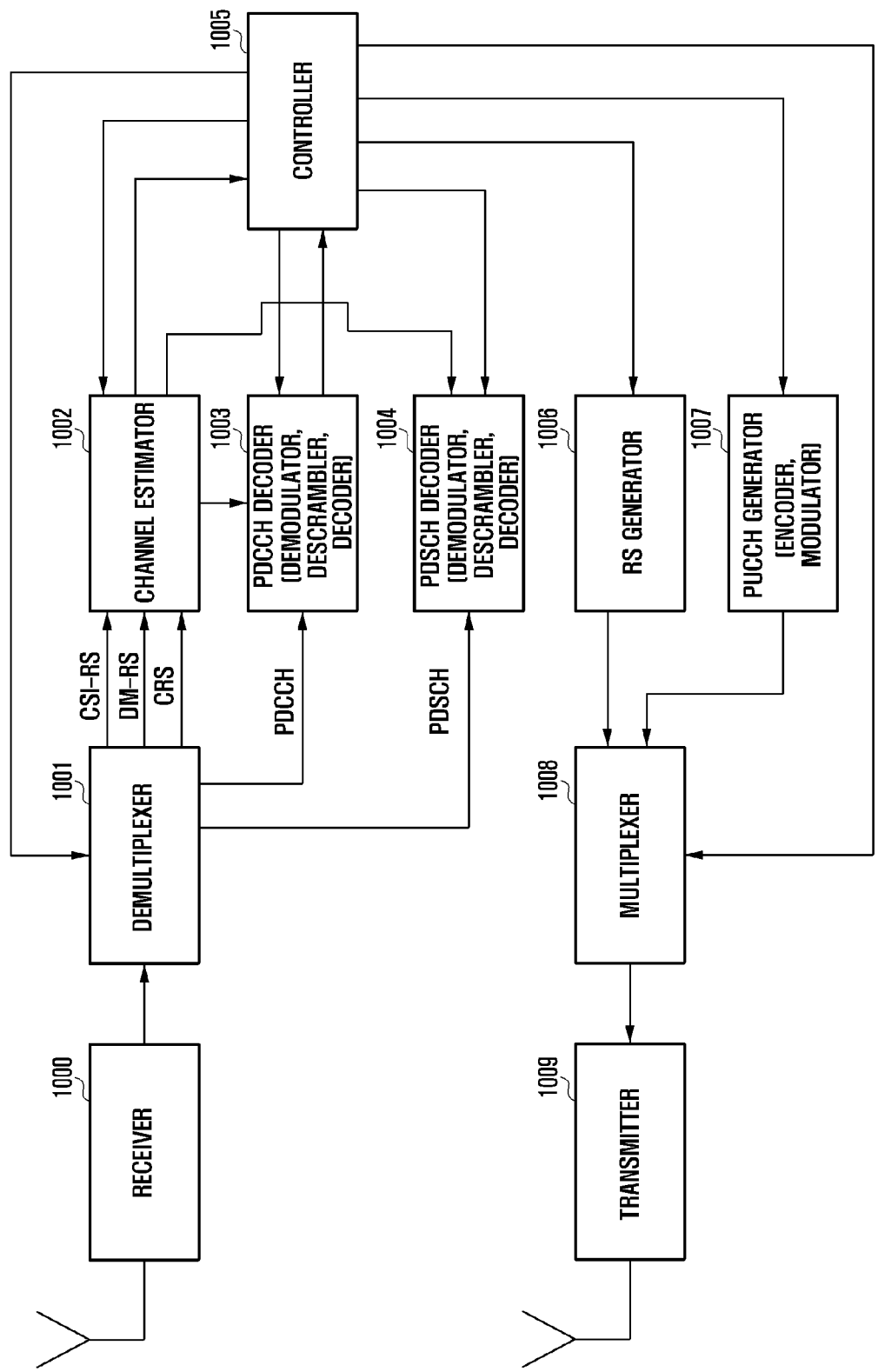
FIG. 11 is a diagram illustrating a configuration of a transceiver of the UE according to an embodiment of the present invention.

FIG. 11 is a diagram illustrating a configuration of a transceiver of the UE according to an embodiment of the present invention.

Referring to FIG. 11, the controller 1005 controls overall transmission and reception operations of the UE. The controller 1005 controls the UE operation to transmit the feedback to the eNB according to the feedback transmission pattern period and feedback transmission pattern information transmitted by the eNB according to the procedure of FIG. 9.

The receiver 1000 converts the RF signal to the baseband signal so as to be transmitted to the eNB. The demultiplexer 1001 demultiplexes the output of the receiver 100 into CSI-RS, DM-RS, CRS, PDCCH, and PDSCH signals under the control of the controller 1005. That is, the controller 1005 controls the demultiplexer 1001 to separate the CSI-RS based on the predetermined CSI-RS transmission subframe number and the transmission period. The channel estimator 1002 receives the CSI-RS, DM-RS, and CRS output from the demultiplexer 1001. The channel estimator 1002 estimates the PDCCH and the PDSCH, using the CRS and the DM-RS respectively, to generate estimation values and generates downlink channel status information using CSI-RS. The PDCCH decoder 1003 receives PDCCH signal from the demultiplexer 1001 and performs descrambling and decoding on the PDCCH signal using the PDCCH estimation signal output from the channel estimator 1002. The PDSCH decoder 1001 receives PDSCH signal from the demultiplexer 1001 and performs demodulation, descrambling, and decoding on the PDSCH signal using the PDSCH channel estimation signal output from the channel estimator 1002.

The PUCCH generator 1007 generates uplink control signal under the control of the controller 1005. Here, the uplink control information may include the feedback information according to an embodiment of the present invention. The RS generator (uplink RS generator) 1006 generates uplink reference signal (RS). The multiplexer 1008 multiplexes the reference signal (RS) and PUCCH control information under the control of the controller 1005. The transmitter 1009 converts the output of the multiplexer 1008 to an RF signal.

In the reception operation of the UE configured as shown in FIG. 11, the demultiplexer 1001 demultiplexes the output of the receiver 1000 into CSI-RS, DM-RS, CRS, PDCCH, and PDSCH signals under the control of the controller 1005. The CSI-RS, DM-RS, and CRS are delivered to the channel estimator 1002. The channel estimator 1002 performs channel estimation using the CRS and outputs the channel estimation value to the PDCCH decoder 1003. The PDCCH decoder 1003 decodes the PDCCH signal input by the demultiplexer 1001 using the CRS-based estimation value input from the channel estimator 1002. The controller 1005 receives the input of the PDSCH allocation information and PDSCH demodulation and decoding information from the PDCCH decoder 1003.

The channel estimator 1002 performs channel estimation with DM-RS and inputs the estimation value to the PDSCH decoder 1004. The PDSCH decoder 1004 decodes the PDSCH output from the demultiplexer 1001 using the DM-RS-based estimation value input by the channel estimator 1002 and the PDSCH demodulation and decoding information input by the controller 1005. At this time, the controller 1005 controls the demultiplexer 1001 to separates the PDSCH based on the PDSCH allocation information input by the PDCCH decoder 1003. The controller 1005 controls the demultiplexer 1001 to separates the CSI-RS based on the predetermined CSI-RS transmission frame number and the transmission period and provides the channel estimator 1002 with the CSI-RS to generate the downlink channel status information.

The downlink channel status information generated by the channel estimator 1002 is provided to the controller 1005, and the controller 1005 provides this information to the PUCCH generator 1007. The PUCCH generator 1007 generates feedback information to the multiplexer 1008 based on this information. The controller 1005 controls the multiplexer 1008 to multiplex the reference signal generated by the uplink reference signal generator 1006 and the feedback signal generated by the PUCCH generator 1007. The multiplexed signal is transmitted through the transmitter 1009.

Here, the controller 1005 receives the feedback-related control information through higher layer signaling and controls feedback-related operation to report the downlink channel status information on the channel estimated using the feedback-related control information to the eNB. At this time, the controller 1005 controls the multiplexer 1008, as described in the first embodiment, to multiplex the downlink channel status informations which are transmitted on the PUCCH such that the SB-CSI feedback informations on the multiple sub-bands and WB-CSI feedback information are transmitted in sequence from the first subframe of the respective predetermined frames. The controller 1005 also controls the multiplexer 1008, as described in the second embodiment of the present invention, to multiplex the downlink channel status informations to be transmitted on the PUCCH such that the downlink channel status informations are transmitted according to the feedback transmission patterns generated by shifting a pattern determined by a certain UE cyclically so as to differ from each other in cell-specific feedback pattern length.

As described above, the apparatus for transmitting the UE's feedback information includes a controller for controlling to transmit the first feedback information at the first time point in the first period and the second feedback information at the second time point in the second period and a transmitter for transmitting the first and second feedback information generated by the controller, wherein the first and second time points are distant differently from the start time points of the respective first and second periods.

Here, the feedback information is calculated based on the channel status information reference signal (CSI-RS) transmitted at a predetermined time period. In case that the first and second feedback informations are the respective SB-CSI and WB-CSI, the first time point close to the start point of the first and second periods as compared to the second time point. The UE includes a channel estimator for generating channel estimation information based on the channel status information reference signal (CSI-RS) transmitted at a predetermined time period, a controller for generating the feedback information based on the channel status information and determining the subframe carrying the feedback information based on the feedback transmission pattern, and a transmitter for transmitting the feedback information to the eNB. The feedback transmission period is configured based on the CSI-RS transmission period.

While the invention is described in terms of some specific examples and embodiments, it will be clear that this invention is not limited to these specific examples and embodiments and that many changes and modified embodiments will be obvious to those skilled in the art without departing from the true spirit and scope of the invention.

What is claimed is:

1. A method for transmitting feedback information of a User Equipment (UE) in a communication system, the method comprising:
   generating first feedback information;
   transmitting the first feedback information at a first time point in a first period;
   generating second feedback information; and
   transmitting the second feedback information at a second time point in a second period,
   wherein the first time point and the second time point are different points from start points of the first period and the second period, respectively.

2. The method of claim 1, wherein the first feedback information and the second feedback information are generated based on a channel status information reference signal (CSI-RS) transmitted at a predetermined time period.

3. The method of claim 1, wherein the first time point is closer to a start time point of the first period than the second time point is to a start time point of the second period, when the first feedback information is sub-band channel status information (SB-CSI) and the second feedback information is wideband channel status information (WB-CSI).

4. The method of claim 1, further comprising:
   receiving feedback transmission pattern information from a base station; and
   determining a subframe for feedback transmission based on the feedback transmission pattern information.

5. The method of claim 1, wherein the first period and the second period are configured based on a CSI-RS transmission period.

6. A method for receiving feedback information of a base station in a communication system, the method comprising:
   receiving first feedback information at a first time point in a first period; and
   receiving second feedback information at a second time point in a second period,
   wherein the first time point and the second time point are different points from start points of the first period and the second period, respectively.

7. The method of claim 6, wherein the first feedback information and the second feedback information are generated based on a channel status information reference signal (CSI-RS) transmitted at a predetermined time period.

8. The method of claim 6, wherein the first time point is closer to a start time point of the first period than the second time point is to a start time point of the second period, when the first feedback information is sub-band channel status information (SB-CSI) and the second feedback information is wideband channel status information (WB-CSI).

9. The method of claim 6, further comprising transmitting feedback transmission pattern information to a User Equipment (UE) that transmits the first feedback information and the second feedback information,
   wherein the UE determines a subframe for feedback transmission based on the feedback transmission pattern information.

10. The method of claim 6, wherein the first period and the second period are configured based on a CSI-RS transmission period.

11. An apparatus for transmitting feedback information in a communication system, the apparatus comprising:
    a transceiver; and
    a controller that generates first feedback information, controls the transceiver to transmit the first feedback information at a first time point in a first period, generates second feedback information, and controls the transceiver to transmit the second feedback information at a second time point in a second period,
    wherein the first time point and the second time point are different points from start points of the first period and the second period, respectively.

12. The apparatus of claim 11, wherein the first feedback information and the second feedback information are generated based on a channel status information reference signal (CSI-RS) transmitted at a predetermined time period.

13. The apparatus of claim 11, wherein the first time point is closer to a start time point of the first period than the second time point is to a start time point of the second period, when the first feedback information is sub-band channel status information (SB-CSI) and the second feedback information is wideband channel status information (WB-CSI).

14. The apparatus of claim 11, further comprising a channel estimator that generates channel status information based on a channel status information reference signal (CSI-RS) transmitted at a predetermined time period,
    wherein the transceiver receives feedback transmission pattern information from a base station, and
    wherein the controller generates the first feedback information and the second feedback information based on the channel status information, and determines a subframe for feedback transmission based on the feedback transmission pattern information.

15. The apparatus of claim 11, wherein the first period and the second period are configured based on a CSI-RS transmission period.

16. An apparatus for receiving feedback information in a communication system, the apparatus comprising:
- a receiver that receives first feedback information at a first time point in a first period and second feedback information at a second time point in a second period; and
- a controller that analyzes the first feedback information and the second feedback information to check downlink channel status,
- wherein the first time point and the second time point are different points from start points of the first period and the second period, respectively.

17. The apparatus of claim 16, wherein the first feedback information and the second feedback information are generated based on a channel status information reference signal (CSI-RS) transmitted at a predetermined time period.

18. The apparatus of claim 16, wherein the first time point is closer to a start time point of the first period than the second time point is to a start time point of the second period, when the first feedback information is sub-band channel status information (SB-CSI) and the second feedback information is wideband channel status information (WB-CSI).

19. The apparatus of claim 16, further comprising a transmitter that transmits a feedback transmission pattern information to a User Equipment (UE) that transmits the first feedback information and the second feedback information,
- wherein the first feedback information and the second feedback information are transmitted in subframes determined by the UE, based on the feedback transmission pattern information.

20. The apparatus of claim 16, wherein the first period and the second period are configured based on a CSI-RS transmission period.

* * * * *